J. P. BLOCKER.
COFFEE URN.
APPLICATION FILED AUG. 11, 1908.
No. 904,113.
Patented Nov. 17, 1908.
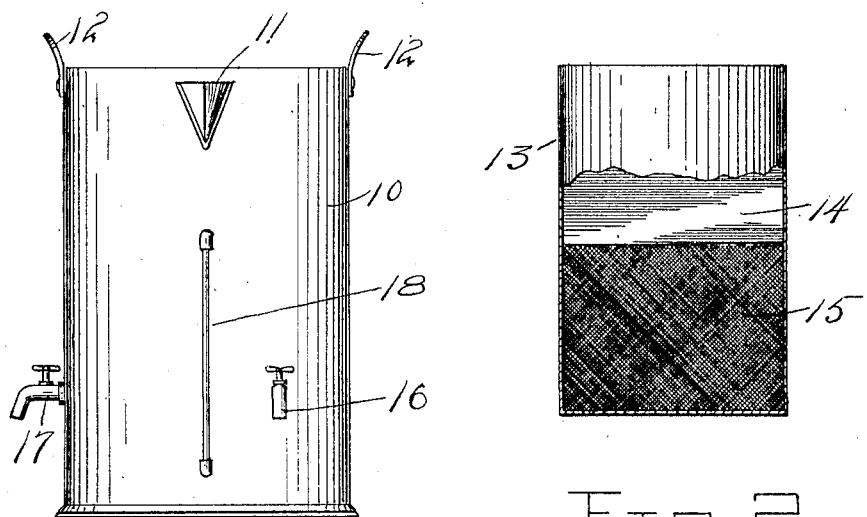
Fig. 1.
Fig. 2.
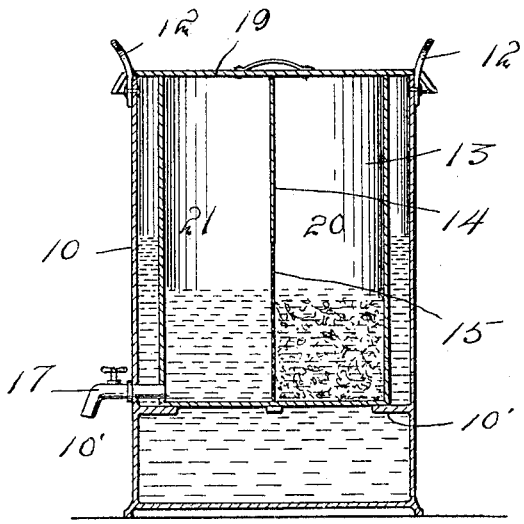
Fig. 3.
Witnesses
C. Simpson
F. B. MacNab
Inventor
John P. Blocker.
By Chandler & Chandler,
Attorneys

UNITED STATES PATENT OFFICE.

JOHN P. BLOCKER, OF LARIMORE, NORTH DAKOTA.

COFFEE-URN.

No. 904,113.      Specification of Letters Patent.      Patented Nov. 17, 1908.

Application filed August 11, 1906. Serial No. 330,213.

*To all whom it may concern:*

Be it known that I, JOHN P. BLOCKER, a citizen of the United States, residing at Larimore, in the county of Grand Forks, State of North Dakota, have invented certain new and useful Improvements in Coffee-Urns; and I do hereby declare the following to be a full, clear, and exact description of the invention, such as will enable others skilled in the art to which it appertains to make and use the same.

This invention has relation to coffee urns or pots in which the coffee or other beverages are or may be made and from which it is drawn.

It is the object of the invention to provide an improved coffee urn comprising an outer and an inner vessel, the coffee beverage being made and strained from the coffee grounds in the inner vessel by the steam and boiling water in the outer or cooking vessel.

The invention is fully illustrated in the annexed drawings forming a part of this specification, in view of which it will be described in detail, with respect to its construction and mode of operation, and then be particularly pointed out in the subjoined claim.

In the drawings:—Figure 1 is a side elevation of the outside vessel of the urn. Fig. 2 is a like view of the inside vessel, a part being represented as broken away to show the construction of the partition and strainer therein. Fig. 3 is a vertical sectional view of the urn complete.

Similar numerals of reference designate similar parts or features, as the case may be, wherever they occur.

In the drawings 10 designates the outside vessel or steamer adapted to hold water, and provided with a spout 11 by which it may be poured off. The vessel 10 is cylindrical in form and may have ears 12, at its top by which it may be carried or otherwise manipulated.

13 designates a cylindrical vessel smaller in diameter than the vessel 10, and adapted to be placed in the latter, and rest at its bottom upon lugs 10' connected with the inside of the outer vessel and extending inward to a distance requisite to enable them to perform their functions, and to support the bottom of the inner vessel at a considerable distance above the bottom of the outer vessel and leaving very appreciable space between the opposing sides of the two vessels. The inner vessel 13 is provided with a centrally arranged vertical partition 14, the lower part 15 of which is foraminous in order that it may act as a strainer. A faucet 16 is connected with the outer vessel to drain it. A faucet 17 extends through the outer vessel and is connected with the inner vessel on one side of the strainer partition. A water-gage 18 is connected with the side of the outer vessel by which the amount of water in the said vessel may be ascertained; and the inner vessel may have a rim 19 at its top extending over the side of the outer vessel as a cover to the latter, provision being made in the rim for the ears 12 to extend vertically therethrough.

Under the construction so far given the outer vessel sustains the relationship of what is commonly called a "steam cooker" to the inner vessel.

In the use of the present invention, boiling water is poured into the outer vessel so as to heat the inner vessel and prevent chilling of the water that is subsequently contributed to the latter. By means of a suitable heater, the temperature of the water in the outer vessel is kept just below boiling. The ground coffee is put in the inner vessel at one side of the partition so as to lie against the foraminous portion 15 and boiling water is then poured in upon the coffee. By maintaining the temperature of the water in the outer vessel just below boiling, such a temperature of the water in the inner vessel may be maintained as will continue the process of extracting from the coffee, without boiling the liquid. In this way the beverage is kept hot, without scorching or continued boiling, which is well known to be ruinous to drip coffee. It is of course understood that after the contents of the vessel have been contributed, the cover 19 is put in place to close both vessels. The lid or cover 19 extending over the tops of both vessels is single in character so that its removal will uncover both vessels.

By making the body of the urn stationary and constructing it as described the device is particularly adapted for use in hotels and restaurants where clarified coffee is made upon an enlarged scale, and is conveniently drawn off only through faucets.

The inwardly extended lugs above the bottom of the outer vessel form a substantial support for the inner vessel which is removable as shown. If the inner vessel were supported or hung from the top it would not be so firmly maintained in position, and could not be so readily manipulated. Special regard is to be had to this feature of the improvement.

What is claimed as the invention, is:—

A coffee-urn composed of an outer vessel comprising a steam cooker provided with inwardly extended lugs above its bottom, an inner vessel resting at its bottom upon said lugs and having a vertical partition therein provided at the bottom part only with a strainer, a faucet extending through the outer vessel and communicating with the inner vessel, a faucet connected with the outer vessel communicating with the interior thereof and a single cover fitting on the tops of both vessels.

In testimony whereof, I affix my signature, in presence of two witnesses.

JOHN P. BLOCKER.

Witnesses:
  THOS. H. PUGH,
  C. J. McGURREN.